United States Patent
Coudurier et al.

(10) Patent No.: US 10,298,971 B2
(45) Date of Patent: May 21, 2019

(54) ENCODING OPTIMIZATION USING BITRATE RANGE COMPARISONS FOR ENCODED SEGMENTS

(71) Applicant: HULU, LLC, Santa Monica, CA (US)

(72) Inventors: Baptiste Coudurier, Los Angeles, CA (US); Eric Buehl, Studio City, CA (US); Robert A. Post, Jr., Marina del Rey, CA (US); Alexander V. Gutarin, Atherton, CA (US)

(73) Assignee: HULU, LLC, Santa Monica, CA (US)

( * ) Notice: Subject to any disclaimer, the term of this patent is extended or adjusted under 35 U.S.C. 154(b) by 505 days.

(21) Appl. No.: 15/177,124

(22) Filed: Jun. 8, 2016

(65) Prior Publication Data

US 2016/0286252 A1    Sep. 29, 2016

Related U.S. Application Data

(63) Continuation of application No. 13/408,205, filed on Feb. 29, 2012, now Pat. No. 9,392,304.

(51) Int. Cl.
*H04N 21/2343* (2011.01)
*H04N 21/262* (2011.01)
(Continued)

(52) U.S. Cl.
CPC ... *H04N 21/23439* (2013.01); *H04L 65/4069* (2013.01); *H04N 19/115* (2014.11);
(Continued)

(58) Field of Classification Search
None
See application file for complete search history.

(56) References Cited

U.S. PATENT DOCUMENTS 6,192,075 B1    2/2001   Jeng et al.
6,298,071 B1   10/2001   Taylor et al.
(Continued)

FOREIGN PATENT DOCUMENTS

JP    2002369145 A    12/2002
KR    10-2009-0058955 A    6/2009

OTHER PUBLICATIONS

Int'l Preliminary Report on Patentability (from a corresponding foreign application), dated Sep. 12, 2012.
(Continued)

*Primary Examiner* — Mohammed Jebari
(74) *Attorney, Agent, or Firm* — Fountainhead Law Group P.C.

(57) ABSTRACT

In one embodiment, a method encodes a first set of segments of a media file based on a first bitrate range to generate a first set of encoded segments. It is then determined when an encoded segment for the first bitrate range includes a bitrate that satisfies a second bitrate range. When the encoded segment for the first bitrate range includes the bitrate that satisfies the second bitrate range, the method does not encode a segment in the first set of segments that corresponds to the encoded segment when the media file is encoded based on the second bitrate range to generate a second set of encoded segments for the second bitrate range. A first playlist for the first bitrate range is identified and a second playlist for the second bitrate range is identified. The second playlist also includes the encoded segment that was encoded for the first bitrate range.

17 Claims, 7 Drawing Sheets

(51) Int. Cl.
  *H04N 21/442* (2011.01)
  *H04N 21/6373* (2011.01)
  *H04N 21/845* (2011.01)
  *H04N 19/115* (2014.01)
  *H04N 19/154* (2014.01)
  *H04L 29/06* (2006.01)
  *H04N 21/234* (2011.01)
  *H04N 19/17* (2014.01)

(52) U.S. Cl.
  CPC ..... *H04N 19/154* (2014.11); *H04N 21/26258* (2013.01); *H04N 21/44209* (2013.01); *H04N 21/6373* (2013.01); *H04N 21/8456* (2013.01); *H04N 19/17* (2014.11)

(56) References Cited

U.S. PATENT DOCUMENTS

| | | | |
|---|---|---|---|
| 8,812,735 B2* | 8/2014 | Igarashi | H04N 21/23406 709/246 |
| 2003/0007516 A1 | 1/2003 | Abramov et al. | |
| 2003/0204519 A1 | 10/2003 | Sirivara et al. | |
| 2008/0052414 A1 | 2/2008 | Panigraphi et al. | |
| 2008/0130737 A1 | 6/2008 | Kamariotis et al. | |
| 2009/0279605 A1 | 11/2009 | Holcomb et al. | |
| 2009/0282162 A1 | 11/2009 | Mehrotra et al. | |
| 2010/0158101 A1 | 6/2010 | Wu et al. | |
| 2010/0169303 A1 | 7/2010 | Biderman et al. | |
| 2010/0217888 A1* | 8/2010 | Ukita | H04L 47/12 709/234 |
| 2011/0122939 A1 | 5/2011 | Ganesan et al. | |
| 2011/0246616 A1 | 10/2011 | Ronca | |
| 2011/0246621 A1 | 10/2011 | May, Jr. | |
| 2011/0246661 A1 | 10/2011 | Manzari | |
| 2011/0296485 A1* | 12/2011 | Nilsson | H04L 47/10 725/114 |
| 2011/0302319 A1 | 12/2011 | Ha et al. | |
| 2011/0320287 A1 | 12/2011 | Holt et al. | |
| 2012/0005368 A1 | 1/2012 | Knittle | |
| 2012/0042091 A1 | 2/2012 | McCarthy et al. | |
| 2012/0084454 A1 | 4/2012 | Lindquist et al. | |
| 2012/0144444 A1 | 6/2012 | Hunt | |
| 2012/0147958 A1 | 6/2012 | Ronca et al. | |
| 2012/0170907 A1 | 7/2012 | Johnson | |
| 2012/0311174 A1 | 12/2012 | Bichot et al. | |
| 2013/0042015 A1* | 2/2013 | Begen | B63B 15/0083 709/231 |
| 2013/0054972 A1 | 2/2013 | Thorwirth | |
| 2013/0091249 A1 | 4/2013 | McHugh et al. | |
| 2013/0103849 A1* | 4/2013 | Mao | H04N 21/8456 709/231 |
| 2013/0145415 A1 | 6/2013 | Major et al. | |
| 2013/0163430 A1 | 6/2013 | Geil | |
| 2013/0166868 A1 | 6/2013 | Jarnikov | |
| 2013/0223510 A1 | 8/2013 | Coudurier et al. | |
| 2014/0025710 A1 | 1/2014 | Sarto | |

OTHER PUBLICATIONS

International Search Report from a corresponding foreign application), dated Jun. 2, 2013.

* cited by examiner

ENCODING OPTIMIZATION USING BITRATE RANGE COMPARISONS FOR ENCODED SEGMENTS

CROSS REFERENCE TO RELATED APPLICATIONS

The present disclosure is a continuation of U.S. patent application Ser. No. 13/408,205, entitled "Encoding Optimization Using Quality Level of Encoded Segments", filed Feb. 29, 2012 (issued as U.S. Pat. No. 9,392,304 B2), the contents of which is incorporated herein by reference in its entirety.

BACKGROUND

When a media file is published, it is typically encoded at different bitrates to accommodate varying bandwidth conditions. Every bitrate version may be sliced into segments. Each segment may be independently downloaded and played by a client. For every bitrate, a server may publish a set of bitrate playlists (e.g., a consecutive list of segments for a given bitrate) and a master playlist (e.g., a list of available bitrate playlists).

During playback, a client may select each consecutive segment based on available bandwidth. This may be done with the goal of maximizing visual quality (i.e., picking the segment with the highest bitrate), while providing an interruption-free experience (i.e., not picking segments that would take too long to download).

Such basic implementations may be well suited for streaming video that is encoded at Constant Bitrate (CBR). However, CBR is not an optimal way to encode video because different types of video scenes have different bandwidth requirements. For example, some sequences may need fewer bits to be encoded, such as sequences that include little motion. Conversely, some sequences need more bits to be encoded, such as in sequences with a lot of motion. Accordingly, various Variable Bitrate (VBR) encoding algorithms have been introduced. The VBR encoding algorithms vary an amount of output data per segment. That is, some segments may have a higher bitrate than other segments.

The media file may be encoded using VBR encoding algorithms based on different constraints. For example, different bitrate ranges may be used as constraints in encoding the video. For a single segment, each bitrate range used with the VBR encoding algorithm may generate an encoded segment at a different bitrate. For example, using a lower bitrate range as a constraint in the VBR encoding algorithm may produce an encoded segment of a lower bitrate than if a higher bitrate range is used.

After encoding using the VBR encoding algorithm, different bitrate playlists are created where each playlist contains segments from the corresponding encoded version of the media file. That is, each bitrate playlist is limited to the encoded segments that were generated using each specific bitrate range.

SUMMARY

In one embodiment, a method encodes a first set of segments of a media file using a variable bitrate encoding algorithm based on a first bitrate range in a plurality of bitrate ranges to generate a first set of encoded segments. It is then determined when an encoded segment in the first set of encoded segments for the first bitrate range includes a bitrate that satisfies a second bitrate range in the plurality of bitrate ranges. When the encoded segment that was encoded for the first bitrate range includes the bitrate that satisfies the second bitrate range, the method does not encode a segment in the first set of segments that corresponds to the encoded segment when the media file is encoded using the variable bitrate encoding algorithm based on the second bitrate range to generate a second set of encoded segments for the second bitrate range. A first playlist for the first bitrate range including the first set of encoded segments is identified and a second playlist for the second bitrate range including the second set of encoded segments is identified. The second playlist also includes the encoded segment that was encoded for the first bitrate range.

In one embodiment, a non-transitory computer-readable storage medium contains instructions, that when executed, control a computer system to be configured for: encoding a first set of segments of a media file using a variable bitrate encoding algorithm based on a first bitrate range in a plurality of bitrate ranges to generate a first set of encoded segments; determining when an encoded segment in the first set of encoded segments for the first bitrate range includes a bitrate that satisfies a second bitrate range in the plurality of bitrate ranges; when the encoded segment that was encoded for the first bitrate range includes the bitrate that satisfies the second bitrate range, not encoding a segment in the first set of segments that corresponds to the encoded segment when the media file is encoded using the variable bitrate encoding algorithm based on the second bitrate range to generate a second set of encoded segments for the second bitrate range; and identifying a first playlist for the first bitrate range including the first set of encoded segments and identifying a second playlist for the second bitrate range including the second set of encoded segments, wherein the second playlist also includes the encoded segment that was encoded for the first bitrate range.

In one embodiment, a method includes: encoding, by a computing device, a media file using a variable bitrate encoding algorithm based on a plurality of bitrate ranges to generate a plurality of sets of encoded segments; comparing, by the computing device, for a segment of the media file, bitrates of respective encoded segments for the segment that were generated for the plurality of bitrate ranges; identifying, by the computing device, for the segment of the media file, an encoded segment from the respective encoded segments based on the comparing; identifying, by the computing device, a playlist for each bitrate range in the plurality of bitrate ranges, wherein the identified encoded segment is included in at least two playlists for at least two bitrate ranges.

The following detailed description and accompanying drawings provide a better understanding of the nature and advantages of the present invention.

DETAILED DESCRIPTION

Described herein are techniques for a system to provide virtual playlists. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
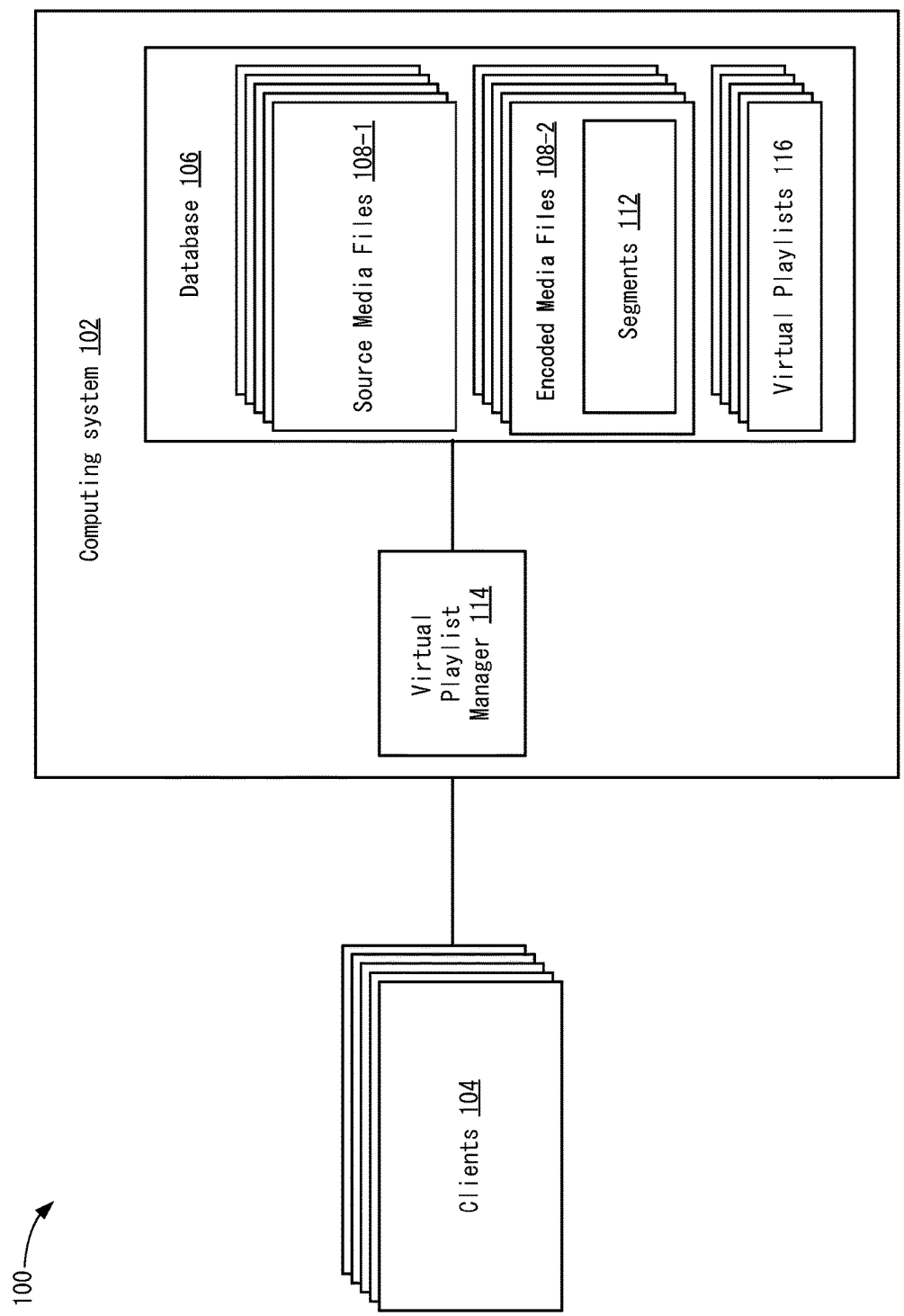
FIG. 1 depicts a system for sending media files to clients using virtual playlists according to one embodiment.

FIG. 1 depicts a system 100 for sending media files 108 to clients 104 using virtual playlists 116 according to one embodiment. System 100 includes a computing system 102 and clients 104. The functions and structures of computing system 102 may be distributed across a computing environment or be found on a single computing machine. Additionally, other structures known in the art, such as communication networks, are not described in detail. Clients 104 may include laptop computers, desktop computers, smartphones, televisions, or other devices capable of downloading media files 108.

Computing system 102 may communicate or stream media files 108 from a database 106 to clients 104. Clients 104 may present the streamed media file 108 to users that may be using a service, such as a streaming video or audio service. The streamed media file 108 may include a video file (e.g., movie, television show, etc.), audio content, or other content.

Database 106 may include source media files 108-1. Source media files 108-1 may be encoded to produce encoded media files 108-2. When media file 108 is referred to, the term may mean a source media file 108-1, encoded media file 108-2, or both. In one embodiment, encoded media files 108-2 are streamed to clients 104. Encoded media files 108-2 include segments 112 that may be a portion of the media file 108. In selected embodiments, segments 112 may be contained within a database 106 as a unit, distinct from media files 108 from which it originated. Alternatively, each segment 112 may be stored in a collection with other segments 112 (e.g., in a collection with all the other segments 112 corresponding to the same media file 108). For example, an encoded media file 108-2 may simply comprise a sequenced collection of the various segments 112. Computing system 102 may send a sequence of segments 112 to clients 104 when a media file 108 is requested.

A virtual playlist manager 114 provides virtual playlists 116 that are used to determine which segments 112 to send to clients 104. As will be described in more detail below, a variable bitrate (VBR) encoding algorithm may be used to encode source media files 108-1 to generate encoded media files 108-2. The variable bitrate encoding algorithm may use various bitrate constraints, such as constant rate factor (CRF), or another method for keeping video quality constant along with other bitrate constraints, such as video buffer verifier (VBV). In one example, the variable bitrate encoding algorithm uses different bitrate ranges to encode source media file 108-1.

As will be described in more detail below, virtual playlist manager 114 identifies virtual playlists 116 based on a quality level and a bitrate constraint for different virtual playlists 116. For example, various virtual playlists at different bitrate ranges may be offered, such as a high bitrate, an intermediate bitrate, and a low bitrate. The different bitrate ranges are provided to account for different bandwidth availability that may occur when streaming segments 112 to clients 104. For example, when available bandwidth to stream segments 112 to clients 104 is high, then a high bitrate virtual playlist 116 may be used to maximize visual quality. However, when available bandwidth to stream segments 112 to clients 104 is low, then a low bitrate virtual playlist 116 may be used. The low bitrate virtual playlist 116 provides segments 112 of a lower bitrate, which are of a lesser visual quality, but take less time to stream to clients 104. Also, bandwidth (e.g., processing availability) of a server that are serving segments 112 to clients 104 may become constrained. For example, the servers may be experiencing high load at certain times due to a high number of requests. Lower bitrate playlists 116 may be used in this case also even though additional bandwidth with respect to a network to send segments 112 to clients 104 is available, such as when load experienced is above a threshold.

Virtual playlists 116 are virtual in that each virtual playlist 116 may include segments 112 that are from different encoded media files 108-2 using different bitrate ranges. Thus, encoded segments 112 are selected for virtual playlist 116 based on a quality level regardless of the bitrate range in which segments 112 were encoded. For example, the intermediate bitrate virtual playlist 116 may include segments 112 that were generated from a variable bitrate encoding using the high bitrate range. In this case, it is determined the encoded segment 112 generated using the high bitrate range has a higher quality (e.g., higher bitrate) than an encoded segment 112 generated using the intermediate bitrate range. As will be discussed in more detail below, the encoded segment 112 that is generated using the high bitrate range may have a bitrate that falls within the intermediate bitrate range, and thus can be used in the intermediate bitrate virtual playlist 116. To illustrate the concept of virtual playlists 116, FIGS. 2A-2C are provided.

Figure 2A:
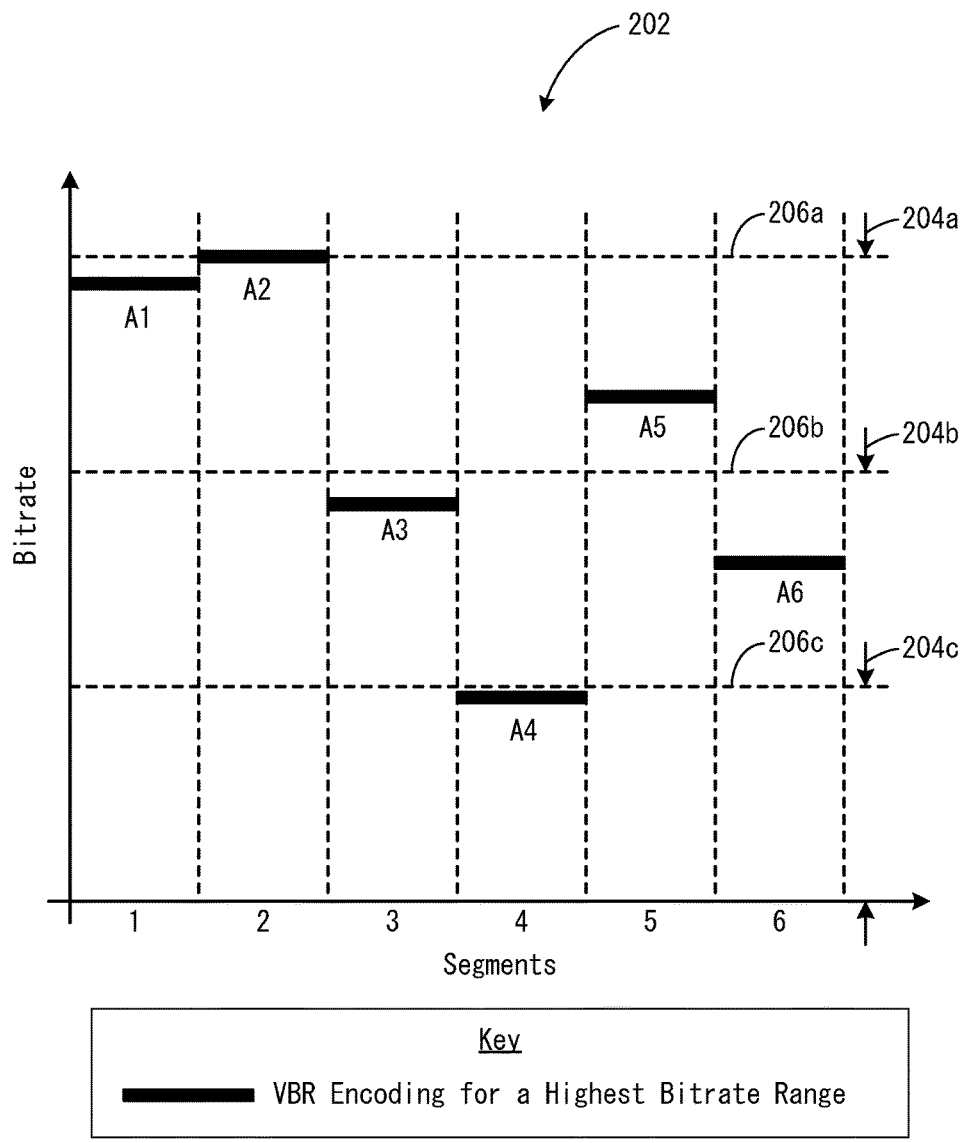
FIG. 2A depicts a schematic graph of a variable bitrate encoding process using a highest bitrate range according to one embodiment.
Figure 2B:
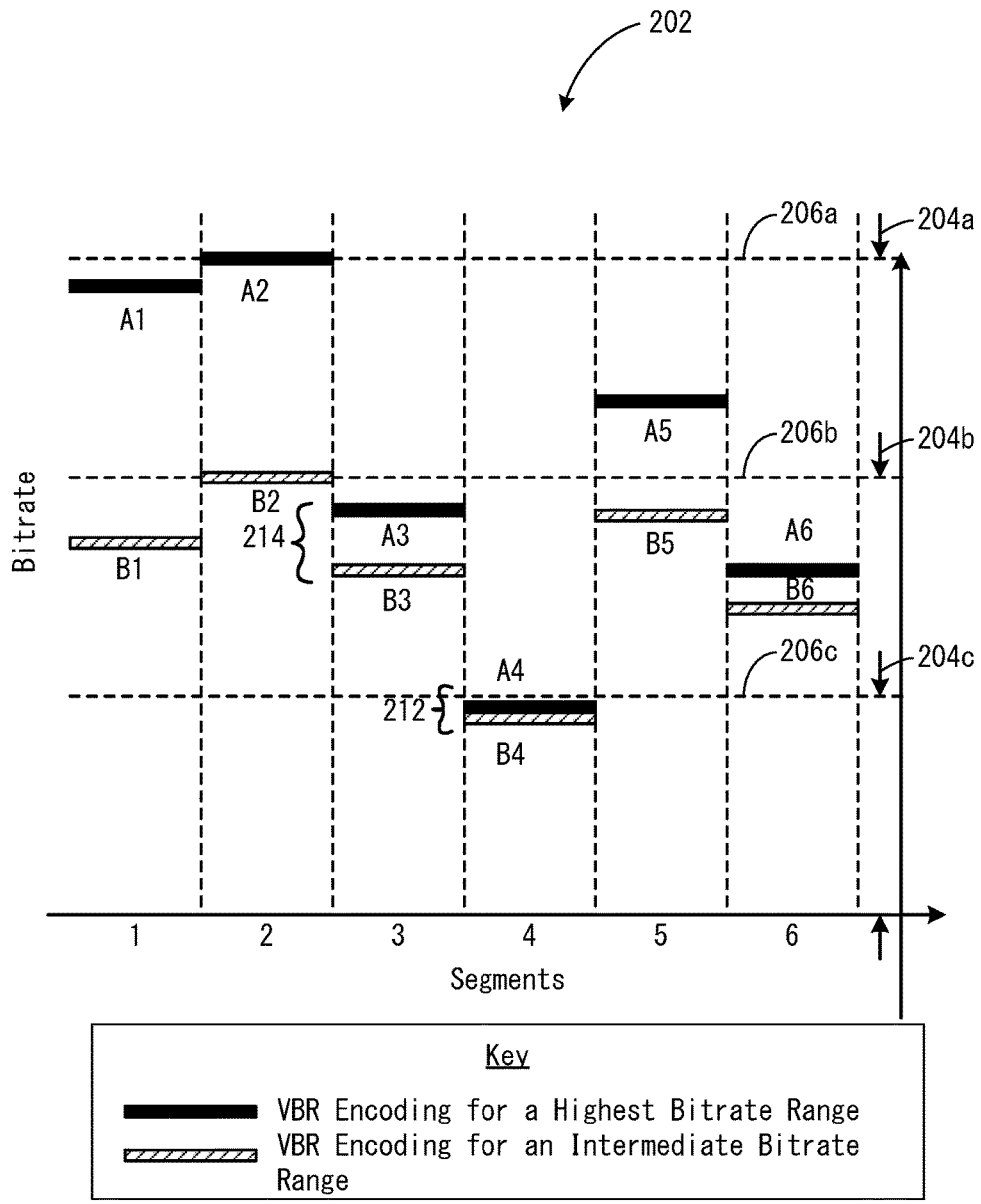
FIG. 2B depicts a schematic graph of a variable bitrate encoding process using an intermediate bitrate range according to one embodiment.
Figure 2C:
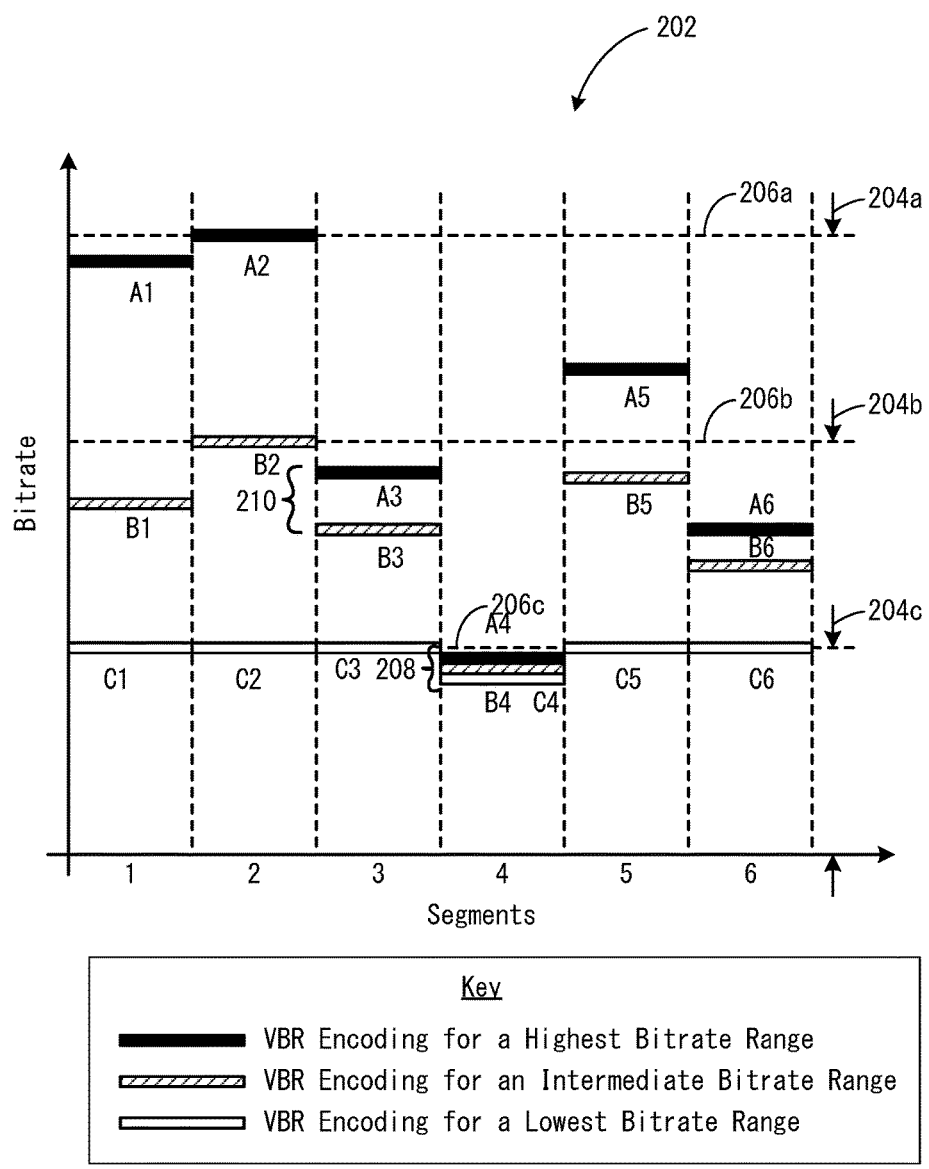
FIG. 2C depicts a schematic graph of a variable bitrate encoding process using a lowest bitrate range according to one embodiment.

Referring to FIG. 2A, a variable bitrate encoding process is explained in further detail through the use of a schematic graph 202. In the encoding process, a source media file 108-1 may be encoded using different bitrate ranges. Each encoded media file 108-2 may be broken up into segments 112. In the illustrated graph 202, a media file 108 has been selected, various segments 112 (six in total) of the media file 108 have been defined, and multiple bitrate ranges 204 (e.g., three in total) have been identified. A highest bitrate range 204a extends up to a highest upper bitrate limit 206a. An intermediate bitrate range 204b extends up to an intermediate upper bitrate limit 206b. A lowest bitrate range 204c extends up to a lowest upper bitrate limit 206c.

In the illustrated graph 202, each segment 112 of media file 108 has been encoded using a VBR encoding algorithm and the highest bitrate range 204a. The resulting encoded segments 112 may be plotted in sequence according to their respective bitrates. The various encoded segments 112 may be sequentially referred to as "A1," "A2," "A3," "A4," "A5," and "A6."

Segments A1 through A6 all have a bitrate less than or equal to the upper limit 206a of the highest range 204a due to using the highest bitrate range 204a as a constraint in the VBR encoding algorithm. While some segments 112 fall within the highest bitrate range 204a, certain segments 112 fall within other bitrate ranges 204 as well. For example, segments A3, A4, and A6 fall within the intermediate bitrate range 204b. Segment A4 also falls within the lowest bitrate range 204c. Accordingly, only a subset of the segments 112 (e.g., segments A1, A2, and A5) may have a bitrate greater than an upper limit 206b of the intermediate bitrate range 204b.

Referring to FIG. 2B, media file 108 has been further encoded using a VBR encoding algorithm and the intermediate bitrate range 204b. The resulting encoded segments 112 may be plotted in sequence according to their respective bitrates. The various segments 112 may be sequentially referred to as "B1," "B2," "B3," "B4," "B5," and "B6." Each segment 112 in this sequence has a bitrate less than or equal to the upper limit 206b of the intermediate bitrate range 204b.

Certain encoded segments 112 may be redundant or unnecessary in view of encoded segments 112 generated previously. For example, segments A3, A4, and A6 all fall within the intermediate bitrate range 204b. Moreover, segments A3, A4, and A6 represent a higher quality product than segments B3, B4, and B6 because the bitrate of segments A3, A4, and A6 are higher than segments B3, B4, and B6. As will be discussed below in more detail, encoded segments B3, B4, and B6 may not be stored for future use. Alternatively, knowing that segments A3, A4, and A6 all fall within the intermediate bitrate range 204b, computing system 102 may avoid even generating encoded segments B3, B4, and B6. That is, computing system 102 may encode only the segments corresponding to a necessary subset (e.g., those corresponding to segments A1, A2, and A5) to form segments B1, B2, and B5. Thus, computing system 102 may avoid storing encoded segments B3, B4, and B6, avoid generating encoded segments B3, B4, and B6, or both.

Referring to FIG. 2C, media file 108 has been further encoded using a VBR encoding algorithm and the lowest bitrate range 204c. The resulting encoded segments 112 may be plotted in sequence according to their respective bitrates. The various segments 112 may be sequentially referred to as "C1," "C2," "C3," "C4," "C5," and "C6." Each segment 112 in this sequence has a bitrate less than or equal to the upper limit 206c of the lowest bitrate range 204c.

Certain encoded segments 112 may be redundant or unnecessary in view of encoded segments 112 generated previously. For example, segment A4 falls within the lowest bitrate range 204c. Moreover, segment A4 represents a higher quality product than segment C4. Accordingly, encoded segment C4 need not be stored for future use. Alternatively, knowing that segment A4 falls within the lowest bitrate range 204c, computing system 102 may avoid even generating encoded segment C4. That is, computing system 102 may encode only the segments corresponding to a necessary subset (e.g., those corresponding to segments A1, A2, A3, A5, and A6) to form segments C1, C2, C3, C5, and C6, and then use previously encoded segment A4. Thus, computing system 102 may avoid storing encoded segment C4, avoid generating encoded segment C4, or both.

Accordingly, in the illustrated graph 202, at least three virtual playlists 116 may be identified based on a quality level. For example, the quality of segments 112 in a bitrate range 204 may be compared to determine the highest quality segment 112 regardless of the bitrate range 204 used to encode each segment 112. A high bitrate virtual playlist 116 (e.g., a playlist 116 suitable for use when the available bandwidth is relatively high) may contain segments A1, A2, A3, A4, A5, and A6. An intermediate bitrate virtual playlist 116 (e.g., a playlist 116 suitable for use when the available bandwidth is at an intermediate level) may contain segments B1, B2, A3, A4, B5, and A6. A low bitrate virtual playlist 116 (e.g., a playlist 116 suitable for use when the available bandwidth is relatively low) may contain segments C1, C2, C3, A4, C5, and C6.

Intermediate bitrate virtual playlist 116 and the low bitrate virtual playlist 116 both include encoded segments 112 of higher than expected quality. That is, both playlists include segments 112 encoded using the highest bitrate range 204a, and these segments 112 have a higher bitrate than corresponding segments 112 that were encoded using the intermediate bitrate range 204b or the low bitrate range 204c. Specifically, the intermediate bitrate virtual playlist 116 includes segments A3, A4, and A6 and the low bitrate virtual playlist 116 include segment A4. Accordingly, the overall quality of the intermediate bitrate virtual playlist 116 and the low bitrate virtual playlist 116 may be improved due to serving higher bitrate segments 112.

Figure 3:
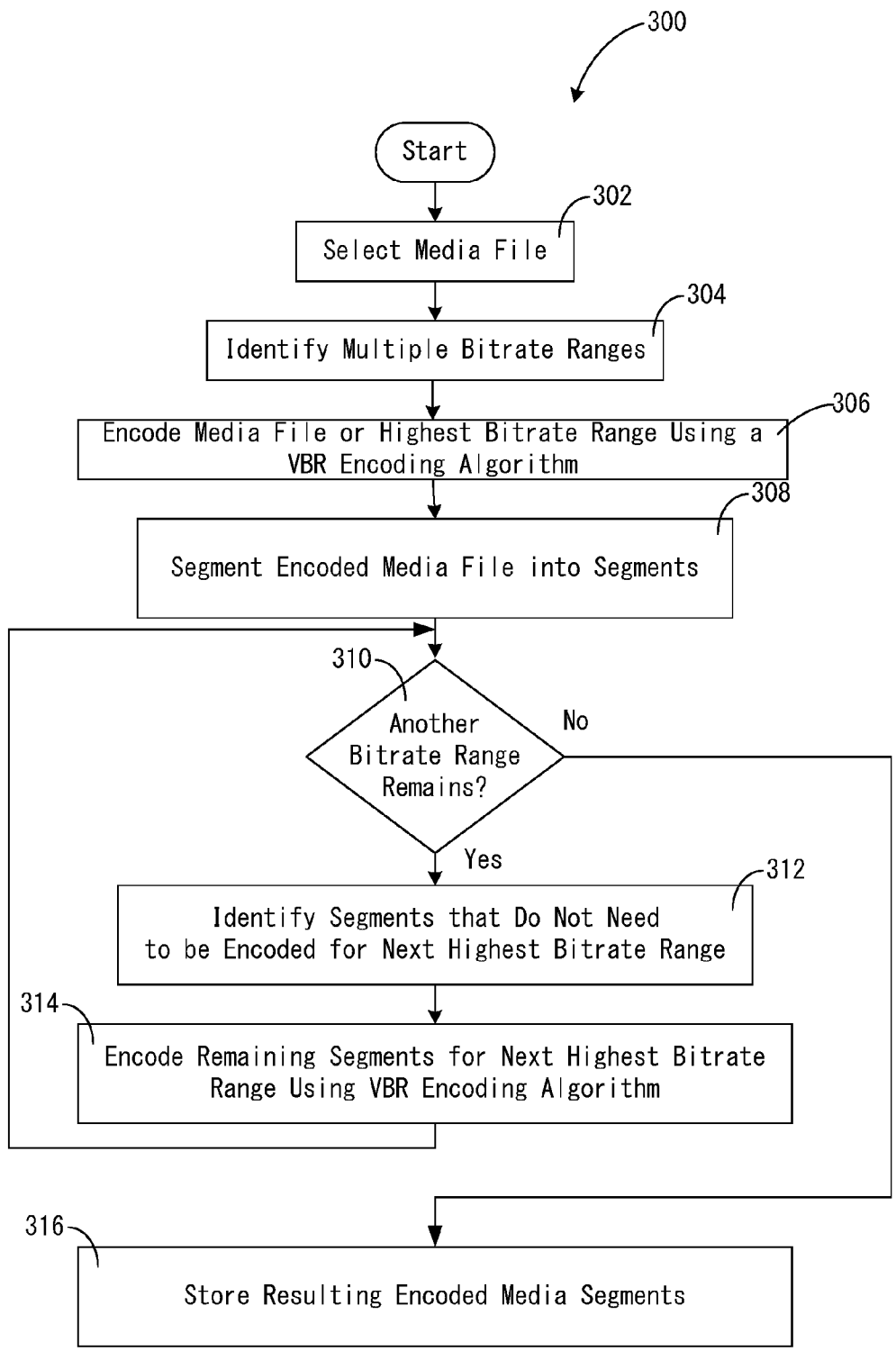
FIG. 3 depicts a simplified flowchart of a method for encoding segments according to one embodiment.

FIG. 3 depicts a simplified flowchart 300 of a method for encoding media files 108 according to one embodiment. At 302, virtual playlist manager 114 selects or obtains a media file 108 (e.g., a source media file 108-1).

At 304, based on the nature of media file 108, nature of typical computer networks, expected variations in bandwidth availability, or the like, multiple bitrate ranges 204 may be identified or defined. In selected embodiments, each bitrate range 204 may correspond to a different bandwidth condition or bandwidth availability and be defined by a different upper bitrate limit 206. For example, a first bitrate range may be the highest range or the range with the highest upper bitrate limit. A second bitrate range may be the next highest range or the range with the next highest upper bitrate limit, and so forth.

At 306, an encoding process may encode media file 108-1 into encoded media file 108-2 for the highest bitrate range using a VBR encoding algorithm. At 308, the encoding process segments encoded media file 108-2 into segments 112

At 310, before the encoding process concludes, virtual playlist manager 114 determines if another bitrate range remains. If another bitrate range remains, the method continues at 312 to identify any segments 112 that do not need to be encoded for the next highest bitrate range. For example, certain segments 112 encoded to fit within highest bitrate range 204a may fall within a lower bitrate range (e.g., an intermediate bitrate range 204b). Accordingly, it may be unnecessarily redundant to again encode those certain segments 112 to fit within any lower bitrate range. For example, referring to FIG. 2C, at 208, segment B4 and C4 may not need to be encoded once it is determined that segment A4 falls within the lowest upper bitrate range 206c. This is because segment A4 is below the lowest bitrate range 204c and a determination that segment A4 offers the best quality in the lowest bitrate range 204c may be made without encoding segments B4 and C4 (due to segment A4 being encoded using the highest bitrate range 204a). Thus, at 314, the remaining segments 112 (e.g., those remaining after the certain segments 112 have been excluded) may be the only segments 112 encoded for the next highest bitrate range using a VBR encoding algorithm. The process then reiterates to 310 to determine if another bitrate range remains.

If no additional bitrate ranges 204 remain, the encoding process may terminate, and at 316, the resulting encoded media segments 112 may be stored. In one embodiment, segments 112 are stored in database 106 after encoding of all bitrate ranges 204 (the encoded segments 112 may have been stored in memory as the encoding process is performed). The determination of which segments 112 to store may be based on the quality level. For example, the highest bitrate segment in a bitrange range 204 may be stored and other segments 112 in bitrate range 204 are not stored. Referring to FIG. 2C, at 210, segment A3 may be stored and segment B3 is not stored. Segment B3 is not stored because when the intermediate bitrange 204b is requested, segment A3 satisfies the bitrate constraint associated with that bitrate range (i.e., segment A3 is lower than the upper limit 206b of bitrate range 204b). In one example, a threshold may be used to determine when negligible differences exist between segments. For example, at 208, segments A4, B4, and C4 may be around the same bitrate. In one example, if the bitrates of segments are within a threshold of a certain percentage, such as 2% of each other, then a user would not be able to discern the difference. In this case, the lowest bitrate segment may be stored, such as segment C4 is stored in this case instead of segment A4.

In other embodiments, certain segments 112 may not be stored. Referring to FIG. 2B, at 212, segment B4 may not be stored because segment A4 satisfies the lowest bitrate range 204c. Thus, storing of any segments 112 that are generated for the intermediate bitrate range 204b and the lowest bitrate range 204c can be avoided. However, at 214, segment B3 may still be stored because it is the lowest bitrate segment generated so far and may need to be sent if the lowest bitrate range 204c is used (however, a segment 112 for the lowest bitrate range 204c may still be generated).

Accordingly, segments 112 that do not need to be encoded or stored for the next highest bit range may be determined based on the quality level of previously-encoded segments 112. For example, if a segment 112 is encoded and falls within a lower bitrate range (e.g., the next highest bitrate range), that segment 112 may not be encoded again. This is because the quality of the encoded segment 112 for the higher bitrate range may be higher than the quality of an encoded segment 112 for the next highest bitrate range. Additionally, segments 112 are not stored because higher quality segments 112 have been previously encoded.

Figure 4:
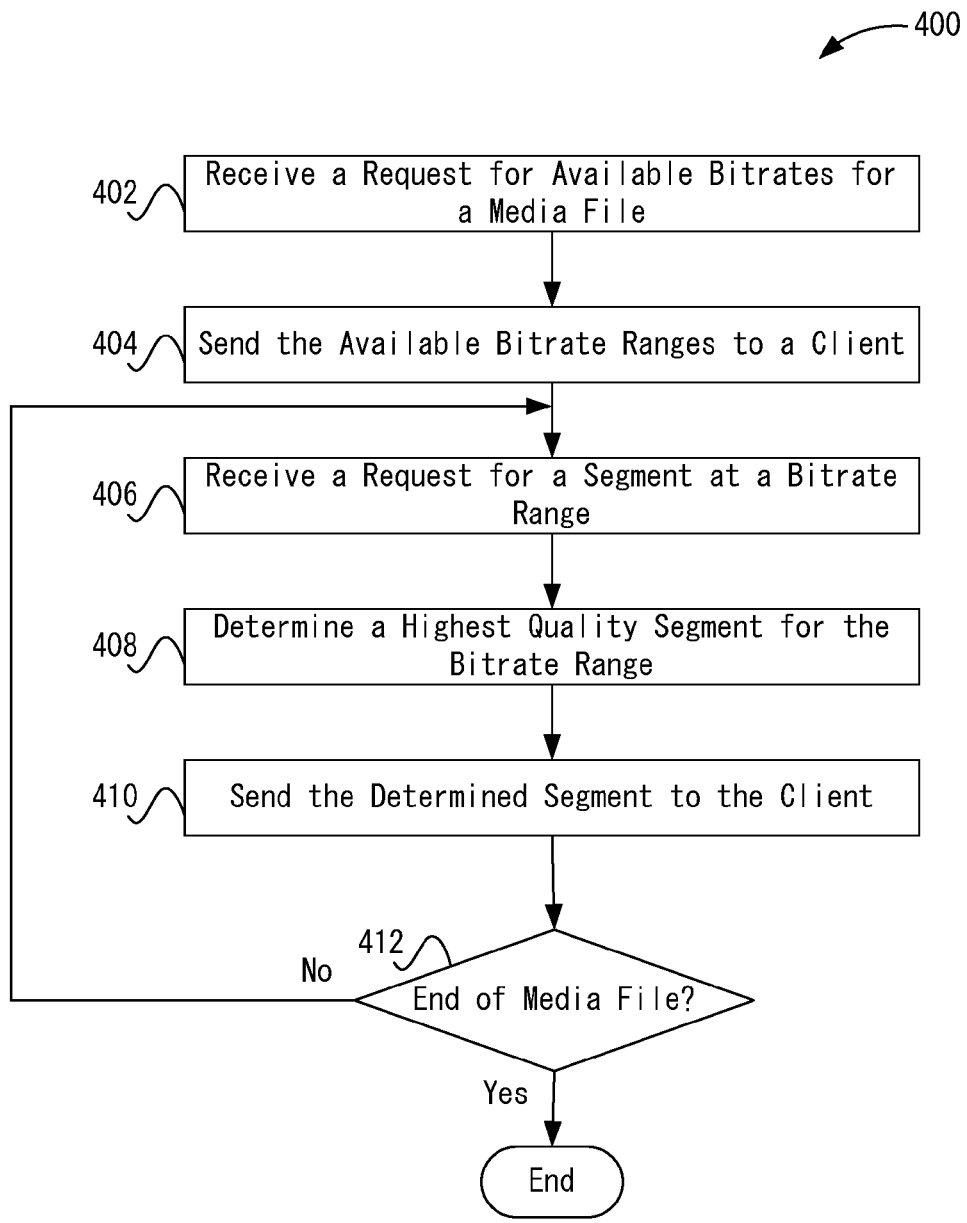
FIG. 4 depicts a simplified flowchart for streaming a media file to a client according to one embodiment.

After encoding, media files 108 may be requested by clients 104. FIG. 4 depicts a simplified flowchart 400 for streaming a media file 108 to client 104 according to one embodiment. At 402, computing system 102 receives a request for available bitrates for a media file 106. The available bitrates may be the highest bitrate range, the intermediate bitrate range, and the lowest bitrate range. At 404, computing system 102 sends the available bitrate ranges to client 104. Client 104 may then select one of the bitrate ranges for streaming segments 112. For example, based on available bandwidth, client 104 selects one of the bitrate ranges that would be appropriate, such as if available bandwidth is high, then highest bitrate range 204a may be selected. Also, client 104 may select the bitrate range for each individual segment 112, groups of segments 112, or for the entire media file 108.

At 406, computing system 102 receives a request for a segment 112 at a bitrate range 204. At 408, virtual playlist manager 114 determines a highest quality segment 112 for the bitrate range. For example, virtual playlists 116 are used to determine the highest quality segment 112 based on the requested bitrate range. In one example, if client 104 requests intermediate bitrate range 204b, intermediate virtual playlist 116 includes segments B1, B2, A3, A4, B5, and A6. When the third segment 112 is served, computing system 102 consults virtual playlist 116 for the intermediate virtual playlist 116, and provides segment A4 to client 104.

In one embodiment, virtual playlists 116 are statically generated. Thus, if the intermediate bitrate range is selected, the intermediate bitrate virtual playlist 116 is consulted to determine the segment 112 to serve. In other embodiments, virtual playlist manager 114 may dynamically determine which segment 112 to provide when the request is received. For example, virtual playlist manager 114 may determine a segment 112 that is stored in database 106 that provides the highest quality that meets the bitrate constraint for the intermediate bitrate range 204b (i.e., a segment 112 that has the highest bitrate that is below the intermediate bitrate upper limit 206b). This segment 112 is determined regardless of the bitrate range that was used to encode this segment 112 using the VBR encoding algorithm.

At 410, computing system 102 sends the determined segment 112 to client 104. At 412, computing system 102 determines if the end of media file 108 has been reached. If not, the process reiterates to 406 where another request from client 104 is received at a bitrate range 204. In some cases, the bitrate range requested may change and computing system 102 consults another virtual playlist 116 to determine a segment 112 to serve. If the end of media file 108 is reached, then the process ends.

Figure 5:
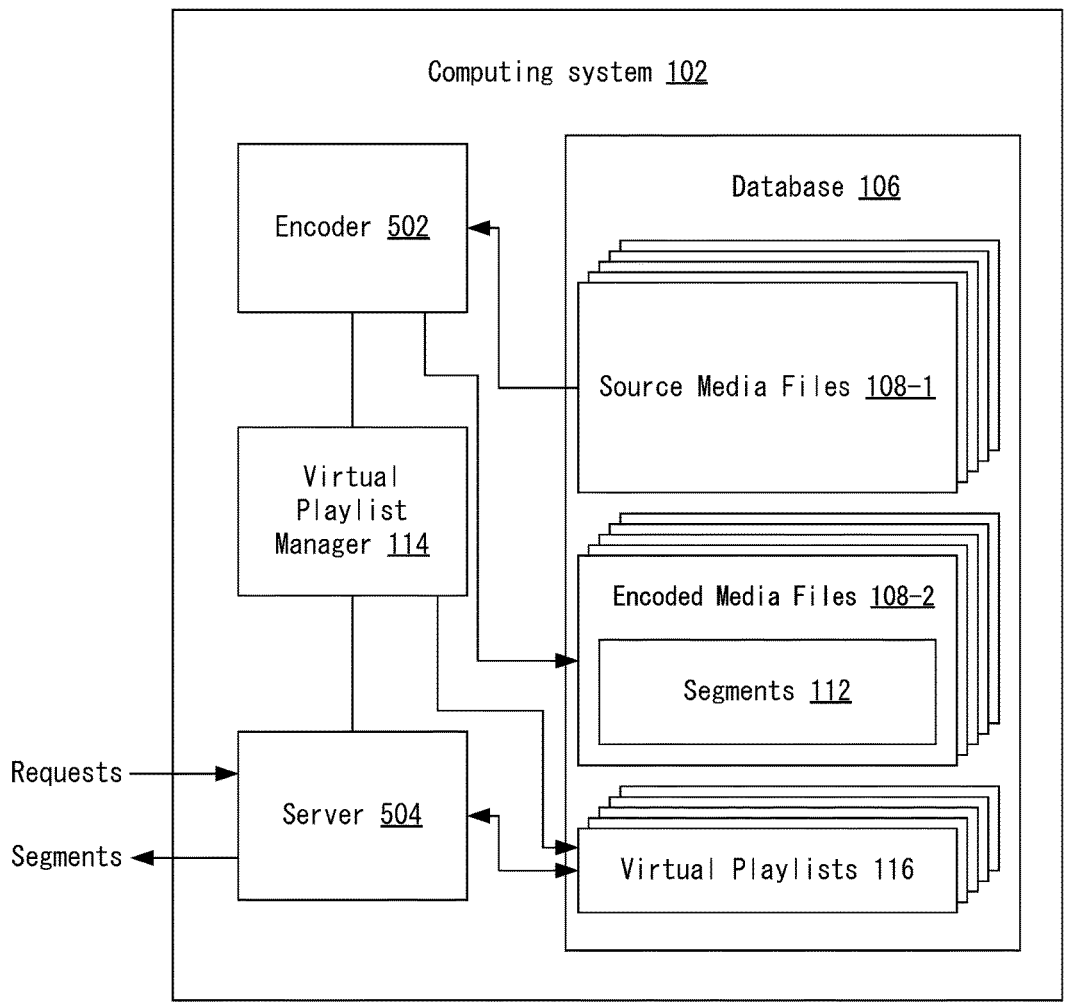
FIG. 5 depicts a more detailed example of computing system according to one embodiment.

FIG. 5 depicts a more detailed example of computing system 102 according to one embodiment. An encoder 502 processes source media files 108-1 to generate encoded media files 108-2. Encoder 502 uses a variable bitrate encoding algorithm to encode source media files 108-1. Encoder 502 stores encoded segments 112 of encode media file 108-2 in database 106. Using particular embodiments, the number of segments 112 that are stored may be reduced. For example, the number of encoded segments 112 stored and served by computing system 102 may be less than the product of the number of bitrate ranges and the number of segments 112. That is, in one example, the number of bitrate ranges is three and the number of segments 112 is six. The product of these two numbers is eighteen. The number of encoded segments stored and served is be fourteen, since encoded segments B3, B4, B6, and C4 may be discarded (or never generated in the first place). Media file 108 may thus be streamed to client 104 at any of the three bitrate ranges 204 exclusively via the fourteen segments 112.

A server 504 receives requests from clients 104 and serves segments 112 to clients 104. In selected embodiments, server 504 may include a bandwidth module. A bandwidth module may characterize the available bandwidth between server 504 and a client 104. Accordingly, using information provided by a bandwidth module, client 104 may better determine which segments 112 to request from server 504.

Server 504, when responding to a request, may use virtual playlist manager 114 to determine which segment 112 to serve. For example, server 504 consults virtual playlists 116 to determine a segment 112 to serve. In other embodiments, a segment 112 may be dynamically determined. In either case, segment 112 is determined based on a quality level.

Accordingly, higher quality segments 112 may be sent to client 104 based on the bitrate range 204 that is requested. Virtual playlist manager 114 provides segments 112 based on a quality level rather than the bitrate range 204 used to encode segments. Thus, virtual playlists 116 provide the ability to serve higher quality segments 112 by not being constrained by the bitrate range 204 used to encode segments 112. This allows segments 112 that are encoded using a different bitrate range 204 than the bitrate range 204 requested by client 104 may be served to provide higher quality segments 112. Additionally, fewer segments 112 may be stored and/or encoded. When multiple versions of a video need to be encoded (e.g., for a mobile device, for a laptop computer, etc.), the saving of storing and encoding segments 112 may be very useful. Also, the serving of higher quality segments 112 provides a better visual user experience.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
encoding, by a computing device, a first set of segments of a media file using a variable bitrate encoding algorithm based on a first bitrate range in a plurality of bitrate ranges to generate a first set of encoded segments;
determining, by the computing device, when an encoded segment in the first set of encoded segments for the first bitrate range includes a bitrate that satisfies a second bitrate range in the plurality of bitrate ranges, wherein determining when the encoded segment that was encoded for the first bitrate range includes life bitrate that satisfies the second bitrate range comprises:
comparing a bitrate of the encoded segment with a highest bitrate of the second bitrate range; and
when the bitrate of the encoded segment is below the highest bitrate, determining the bitrate of the encoded segment satisfies the second bitrate range;
when the encoded segment that was encoded for the first bitrate range includes the bitrate that satisfies the second bitrate range, not encoding, by the computing device, a segment in the first set of segments that corresponds to the encoded segment when the media file is encoded using the variable bitrate encoding algorithm based on the second bitrate range to generate a second set of encoded segments for the second bitrate range; and
identifying, by the computing device, a first playlist for the first bitrate range including the first set of encoded segments and identifying a second playlist for the second bitrate range including the second set of encoded segments, wherein the second playlist also includes the encoded segment that was encoded for the first bitrate range.

2. The method of claim 1, wherein the first bitrate range includes a bitrate that is higher than a highest bitrate in the second bitrate range.

3. The method of claim 1, further comprising:
when encoding the first set of segments in the media file based on the second bitrate range, determining when the segment in the first set of segments that corresponds to the encoded segment is identified; and
when the segment in the first set of segments that corresponds to the encoded segment is identified, not encoding the segment in the first set of segments for the second bitrate range.

4. The method of claim 1, further comprising:
before encoding the first set of segments in the media file based on the second bitrate range, determining encoded segments in the first set of encoded segments from the first bitrate range that satisfy the second bitrate range; and
not encoding segments in the first set of segments that correspond to the encoded segments when encoding the first set of segments based on the second bitrate range.

5. The method of claim 1, further comprising:
storing the first set of encoded segments; and
storing the second set of encoded segments, wherein an encoded segment corresponding to the segment in the first set of segments that is encoded based on the second bitrate range is not stored.

6. The method of claim 1, further comprising:
receiving a request from a client for a segment in the first set of segments of the media file at the second bitrate range in the plurality of bitrates;
identifying the encoded segment that was encoded for the first bitrate range; and
sending the encoded segment to the client.

7. A non-transitory computer-readable storage medium containing instructions, that when executed, control a computer system to be configured for:
encoding a first set of segments of a media file using a variable bitrate encoding algorithm based on a first bitrate range in a plurality of bitrate ranges to generate a first set of encoded segments;
determining when an encoded segment in the first set of encoded segments for the first bitrate range includes a bitrate that satisfies a second bitrate range in the plurality of bitrate ranges, wherein determining when the encoded segment that was encoded for the first bitrate range includes life bitrate that satisfies the second bitrate range comprises:
comparing a bitrate of the encoded segment with a highest bitrate of the second bitrate range; and
when the bitrate of the encoded segment is below the highest bitrate, determining the bitrate of the encoded segment satisfies the second bitrate range;
when the encoded segment that was encoded for the first bitrate range includes the bitrate that satisfies the second bitrate range, not encoding a segment in the first set of segments that corresponds to the encoded segment when the media file is encoded using the variable bitrate encoding algorithm based on the second bitrate range to generate a second set of encoded segments for the second bitrate range; and
identifying a first playlist for the first bitrate range including the first set of encoded segments and identifying a second playlist for the second bitrate range including the second set of encoded segments, wherein the second playlist also includes the encoded segment that was encoded for the first bitrate range.

8. The non-transitory computer-readable storage medium of claim 7, wherein the first bitrate range includes a bitrate that is higher than a highest bitrate in the second bitrate range.

9. The non-transitory computer-readable storage medium of claim 7, further configured for:
   when encoding the first set of segments in the media file based the second bitrate range, determining when the segment in the first set of segments that corresponds to the encoded segment is identified; and
   when the segment in the first set of segments that corresponds to the encoded segment is identified, not encoding the segment in the first set of segments for the second bitrate range.

10. The non-transitory computer-readable storage medium of claim 7, further configured for:
    before encoding the first set of segments in the media file based on the second bitrate range, determining encoded segments in the first set of encoded segments from the first bitrate range that satisfy the second bitrate range; and
    not encoding segments in the first set of segments that correspond to the encoded segments when encoding the first set of segments based on the second bitrate range.

11. The non-transitory computer-readable storage medium of claim 7, further configured for:
    storing the first set of encoded segments; and
    storing the second set of encoded segments, wherein an encoded segment corresponding to the segment in the first set of segments that is encoded based on the second bitrate range is not stored.

12. The non-transitory computer-readable storage medium of claim 7, further configured for:
    receiving a request from a client for a segment in the first set of segments of the media file at the second bitrate range in the plurality of bitrates;
    identifying the encoded segment that was encoded for the first bitrate range; and
    sending the encoded segment to the client.

13. A method comprising:
    encoding, by a computing device, a media file using a variable bitrate encoding algorithm based on a plurality of bitrate ranges to generate a plurality of sets of encoded segments;
    comparing, by the computing device, for a segment of the media file, bitrates of respective encoded segments for the segment that were generated for the plurality of bitrate ranges;
    identifying, by the computing device, for the segment of the media file, an encoded segment from the respective encoded segments based on the comparing, wherein identifying comprises comparing a bitrate of the encoded segment with a highest bitrate of one of the at least two bitrate ranges;
    identifying, by the computing device, a playlist for each bitrate range in the plurality of bitrate ranges, wherein the identified encoded segment is included in at least two playlists for at least two bitrate ranges when the bitrate of the encoded segment is below the highest bitrate of one of the at feast two bitrate ranges.

14. The method of claim 13, further comprising:
    only storing the identified encoded segment a single time in storage for the at least two playlists.

15. The method of claim 13, further comprising:
    not storing respective encoded segments other than the identified encoded segment in storage.

16. The method of claim 13, further comprising:
    storing a first set of encoded segments for a first playlist in the at least two playlists; and
    storing a second set of encoded segments for a second playlist in the at least two playlists, wherein the first set of encoded segments and the second set of encoded segments both include the identified encoded segment.

17. The method of claim 13, wherein identifying the encoded segment from the respective encoded segments comprises:
    identifying the encoded segment with a highest bitrate among the respective encoded segments that falls below a highest bitrate of one of the at least two bitrate ranges.

* * * * *